May 31, 1927.
G. MAKRIS
BICYCLE
Filed July 29, 1926
1,630,442
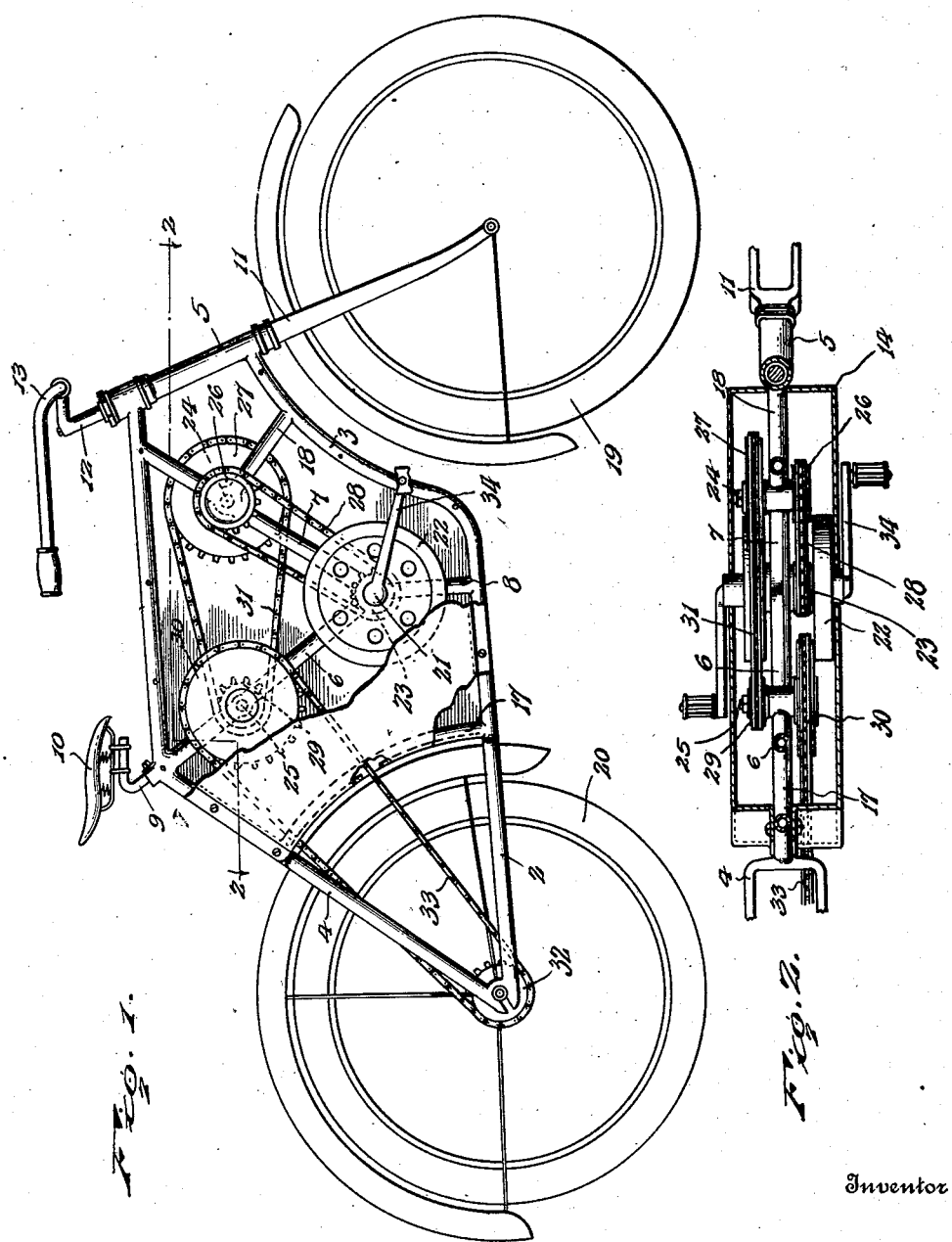
Inventor
G. Makris.
By Lacey & Lacey, Attorneys Patented May 31, 1927.

1,630,442

UNITED STATES PATENT OFFICE.

GEORGE MAKRIS, OF MASSILLON, OHIO.

BICYCLE.

Application filed July 29, 1926. Serial No. 125,788.

This invention relates to vehicles and more particularly to the type adapted to be manually propelled and generally designated as velocipedes.

The invention provides a vehicle of the bicycle type embodying a frame of peculiar construction and a novel arrangement of gearing whereby the speed is stepped up.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof reference is to be had to the following description and the drawings hereto attached in which,—

Figure 1 is a side view of a bicycle embodying the invention, portions of the covering plate being broken away, and Figure 2 is a detail plan sectional view on the line 2—2 of Figure 1.

Corresponding and like parts are referred to in the following description and designated in the two views of the drawings, by like reference characters.

The frame of the bicycle comprises an upper reach 1, a lower reach 2, having its front portion curved upwardly and forwardly, as indicated at 3, a rear fork 4 and a head tube 5 connecting the upper reach 1 and the curved portion 3 of the lower reach 2. The frame is strengthened by means of a Y-brace comprising the oppositely inclined members 6 and 7 and the vertical member 8. The inclined member 6 of the Y-brace receives the seat post 9 to which the seat 10 is connected in the usual way. The several parts 1, 4 and 6 may be connected by means of a cluster, or in any preferred way common in the art. The Y-brace, in addition to stiffening and reinforcing the frame, provides substantial supporting means for the train of gearing whereby the speed is stepped up. The steering fork 11 is mounted in the head tube 5 in any usual or determinate way and receives the steering post 12 to which the handle bar 13 is connected. The train of gearing is disposed within the outline of the frame and is enclosed by covering plates 14 which are connected at their marginal edges to members of the frame in a manner to form a housing which encloses the gearing. A curved bar 17 connects the lower reach 2 with the rear fork 4 and the rear portion of the housing is connected thereto. A stay 18 connects the forward portion of the part 3 with the upper portion of the inclined member 7.

The front wheel 19 is mounted in the steering fork 11 and the rear wheel 20 to which the power is applied, is mounted in the fork of the lower reach 2 and the member 4. The crank shaft 21 is mounted in a crank hanger disposed at the intersection of the several members 6, 7 and 8, of the Y-brace. A fly-wheel 22 is fast to the crank shaft 21 and a sprocket wheel 23 is likewise fast to the crank shaft 21. An axle 24 is disposed in the length of the member 7 at the juncture of the stay 18 therewith. An axle 25 is located in the length of the member 6. Connected sprocket wheels 26 and 27 are mounted upon the axle 24, the sprocket wheel 26 being connected by means of a sprocket chain 28 with the sprocket wheel 23. Connected sprocket wheels 29 and 30 are mounted upon the axle 25 and the sprocket wheel 29 is connected by means of sprocket chains 31 with the sprocket wheel 27. A sprocket wheel 32 fast to the axle of the rear wheel 20 is connected by means of a sprocket chain 33 with the sprocket wheel 30. The crank shaft 21 is provided at opposite ends with crank arms 34 which are equipped with pedals to receive the feet of the driver.

It will be readily understood from the foregoing, taken in connection with the accompanying drawings that the frame of the vehicle is strengthened and braced and the bracing means provides a convenient and substantial support for the train of gearing, which is such as to admit of the speed being augmented, and the gearing being completely enclosed and protected.

Having thus described the invention, I claim:

In a bicycle, a frame comprising an upper reach, a lower reach having its front portion curved upwardly and forwardly, a head tube connecting the front ends of the reaches, a fork connecting the rear ends of the reaches, a Y-brace having its vertical member connected to the lower reach and its inclined members to opposite ends of the upper reach, a stay connecting the upper curved portion of the lower reach with the forward inclined member of the Y-brace and a curved bar connecting the lower reach with the said fork, a crank shaft mounted upon the Y-brace at the intersection of its several members, a train of gearing including sprocket wheels mounted upon the inclined members of the Y-brace, and covering plates at the sides of the frame and connected at their marginal edges to members of the frame.

In testimony whereof I affix my signature.

GEORGE MAKRIS. [L. S.]